(12) United States Patent
Wiest et al.

(10) Patent No.: US 8,904,878 B2
(45) Date of Patent: Dec. 9, 2014

(54) ULTRASONIC FLOW MEASURING SYSTEM INCLUDING A MOUNTING LATCH FOR MOUNTING THE TRANSDUCERS TO THE MEASURING TUBE

(75) Inventors: Achim Wiest, Weil am Rhein (DE); Michal Bezdek, Aesch (CH)

(73) Assignee: Endress + Hauser Flowtec AG, Reinach (CH)

( * ) Notice: Subject to any disclaimer, the term of this patent is extended or adjusted under 35 U.S.C. 154(b) by 531 days.

(21) Appl. No.: 13/142,618

(22) PCT Filed: Dec. 11, 2009

(86) PCT No.: PCT/EP2009/066914
§ 371 (c)(1),
(2), (4) Date: Jun. 29, 2011

(87) PCT Pub. No.: WO2010/076153
PCT Pub. Date: Jul. 8, 2010

(65) Prior Publication Data
US 2012/0192656 A1    Aug. 2, 2012

(30) Foreign Application Priority Data

Dec. 29, 2008   (DE) .......................... 10 2008 055 167

(51) Int. Cl.
*G01F 1/20*      (2006.01)
*G01F 1/66*      (2006.01)

(52) U.S. Cl.
CPC ...................................... *G01F 1/662* (2013.01)
USPC ..................................... 73/861.18; 73/861.28

(58) Field of Classification Search
None
See application file for complete search history.

(56) References Cited

U.S. PATENT DOCUMENTS

| | | | | |
|---|---|---|---|---|
| 5,463,906 | A * | 11/1995 | Spani et al. | 73/861.27 |
| 6,058,779 | A * | 5/2000 | Cole | 73/715 |
| 6,142,008 | A * | 11/2000 | Cole et al. | 73/19.03 |
| 6,382,029 | B1 * | 5/2002 | Shoureshi et al. | 73/643 |
| 7,673,527 | B2 * | 3/2010 | Ehring et al. | 73/861.28 |
| 8,489,342 | B2 * | 7/2013 | Dugger et al. | 73/861.28 |
| 2008/0196511 | A1 * | 8/2008 | Ehring et al. | 73/861.31 |

\* cited by examiner

*Primary Examiner* — Harshad R Patel
(74) *Attorney, Agent, or Firm* — Bacon & Thomas, PLLC

(57) ABSTRACT

A measuring tube, a measuring system and a method for determining and/or monitoring flow through a measuring tube, comprising a measuring tube, on which ultrasonic transducers are releasably placeable. The ultrasonic transducers transmit and/or receive ultrasonic signals, which pass through the measuring tube approximately coaxially to the measuring tube axis. At least one ultrasonic transducer comprises at least one tiltable clamp which can be locked into at least one elevation or depression located on the measuring tube.

9 Claims, 10 Drawing Sheets

ULTRASONIC FLOW MEASURING SYSTEM INCLUDING A MOUNTING LATCH FOR MOUNTING THE TRANSDUCERS TO THE MEASURING TUBE

TECHNICAL FIELD

The present invention relates to a measuring system for determining and/or monitoring flow of a measured medium through a measuring tube by means of ultrasound, with a first ultrasonic transducer and at least one additional, second ultrasonic transducer. The measuring tube has a measuring tube inlet and a measuring tube outlet and a first ultrasonic transducer seat and at least one other, second ultrasonic transducer seat. The first ultrasonic transducer is acoustically coupleable releasably with the first ultrasonic transducer seat of the measuring tube, and the second ultrasonic transducer is acoustically coupleable releasably with the second ultrasonic transducer seat of the measuring tube.

BACKGROUND DISCUSSION

Ultrasound flow measuring devices are often used in process and automation technology. They permit volume flow and/or mass flow in a pipeline to be determined in simple manner.

Known ultrasound flow measuring devices frequently work according to the Doppler principle or according to the travel time difference principle.

In the case of the travel time difference principle, the different travel times of ultrasonic pulses are evaluated relative to the flow direction of the liquid.

For this, ultrasonic pulses are transmitted at a certain angle to the tube axis, both in the direction of flow as well as also counter to the flow. From the travel time difference, the flow velocity can be determined, and therewith, in the case of a known diameter of the pipeline section, also the volume flow.

In the case of the Doppler principle, ultrasonic waves with a certain frequency are coupled into the liquid and the ultrasonic waves reflected by the liquid are evaluated. From the frequency shift between the in-coupled and the reflected waves, the flow velocity of the liquid can likewise be determined.

Reflections in the liquid occur, however, only when small air bubbles or impurities are present in the liquid, so the Doppler principle is made use of mainly in the case of contaminated liquids.

The ultrasonic waves are produced or received with the assistance of so-called ultrasonic transducers. For this, ultrasonic transducers are firmly attached to the tube wall of the relevant pipeline section. More recently, clamp-on ultrasound flow measuring systems are also obtainable. In the case of these systems, the ultrasonic transducers are only pressed onto the tube wall with a clamp. Such systems are known, for example, from EP 686 255 B1, U.S. Pat. No. 4,484,478 or U.S. Pat. No. 4,598,593.

A further ultrasound flow measuring device, which works according to the travel time difference principle, is known from U.S. Pat. No. 5,052,230. The travel time is ascertained here by means of short ultrasonic pulses.

A large advantage of clamp-on ultrasound flow measuring systems is that they do not contact the measured medium and are placed on an already existing pipeline.

The ultrasonic transducers are normally composed of a piezoelectric element, also called a "piezo" for short, and a coupling layer, also called a "coupling wedge" or, less frequently, a "lead-in element". The coupling layer is, in such case, most often manufactured from synthetic material; the piezoelectric element is, in industrial process measurements technology, usually composed of a piezoceramic. In the piezoelectric element, the ultrasonic waves are produced, and, via the coupling layer, are conducted to the tube wall, and are from there led into the liquid. Since the velocities of sound in liquids and synthetic materials are different, the ultrasonic waves are refracted during the transition from one medium to the other. The angle of refraction is determined to a first approximation according to Snell's law. The angle of refraction is thus dependent on the ratio of the propagation velocities in the media.

Between the piezoelectric element and the coupling layer, another coupling layer can be arranged, a so-called adapting or matching layer. In such case, the adapting or matching layer performs the function of transmission of the ultrasonic signal, and simultaneously of reduction of a reflection off of interfaces between two materials caused by different acoustic impedances.

In U.S. Pat. No. 5,179,862, an ultrasonic measuring system is disclosed, wherein a flexible measuring tube—a hose—can be drawn into in a fixed apparatus. The fixed part of the measuring system accommodates the ultrasonic transducer. If an ultrasonic signal runs axially through the measuring tube, the measuring tube is bent at two locations lying opposite each other. Between the bends is thus located the actual measuring path of the measuring tube; the bends could be considered as a measuring tube inlet and measuring tube outlet with the same diameter as the measuring tube. At the bends, the coupling elements of the ultrasonic transducers couple the ultrasonic signals into the measuring tube and, respectively, out of the measuring tube. In this regard, the coupling elements have corresponding in-coupling and/or out-coupling surfaces, which, in each case, form an angle with respect to the piezoelectric elements, wherein the piezoelectric elements, for their own part, are arranged planparallel to one another and perpendicular to the measuring tube axis. The sound-emitting or sound-receiving surfaces of the piezoelectric elements are at least the size of the diameter of the measuring tube. A disadvantage of angles between the sound-emitting or sound-receiving surfaces of the piezoelectric elements and the in-coupling or out-coupling surfaces of the coupling elements is that the velocities of sound in the coupling elements and in the measuring tube and/or in the measured medium must be matched to one another and with the angles to obtain a signal path for the ultrasonic signal, which is parallel to the measuring tube axis.

Other examples of ultrasound flow measuring systems with ultrasonic transducers arrangeable axially on the ends of a measuring tube are shown in U.S. Pat. No. 5,463,906 and U.S. Pat. No. 5,717,145. Also applied are piezoelectric elements with sound-emitting or sound-receiving surfaces, which at least correspond to the size of the diameter of the measuring tube, in order to metrologically register the entire measuring tube cross section.

Also EP 1 760 436 A2 shows an ultrasound flow measuring system with a measuring tube, through which ultrasound waves are axially projected. The measuring tube includes piezoelectric elements, whose sound-emitting or sound-receiving surfaces have a diameter, which is at least as large as the diameter of the measuring tube.

In contrast, in US 2007/0227263 A1, an ultrasound flow measuring system is described, which has a measuring tube, which has four openings. Two openings are provided for the connection to the process. These openings form, respectively, a measuring tube inlet, and a measuring tube outlet, and which are perpendicular to the measuring tube axis. The measuring tube inlet and the measuring tube outlet are both on the same side of the measuring tube. The ultrasonic transducers are inserted in the two other openings of the measuring tube. The coupling elements of the ultrasonic transducers axially close off the measuring tube. The ultrasonic transducers are arranged essentially planparallely and at an angle of 90° with respect to the measuring tube axis. The in-coupling and/or out-coupling surfaces of the coupling elements of the ultrasonic transducer for coupling the ultrasonic signals into and out of the measured medium are convex. Directly before the in-coupling and/or out-coupling surfaces, thus in the region of the coupling of the ultrasonic signals into or out of the measured medium, the measuring tube has an enlarged cross section. The diameters of the essentially disc-shaped ultrasonic transducers are larger than the diameters of a significant part of measuring path of the measuring tube. Due to the cross sectional change of the measuring tube before the in-coupling and/or out-coupling surfaces, there arise chambers, where the measured medium can collect just before the in-coupling and/or out-coupling surfaces. Since the diameter of the measuring tube inlets or measuring tube outlets and the measuring path of the measuring tube itself are essentially equal, the flow of the measured medium before the in-coupling and/or out-coupling surfaces is slowed, and in the measuring tube, in an essential part the measuring path, it is accelerated.

WO 2008/101662 A2 also has a similar construction of the measuring cell. Here, the diameters of the measuring tube inlets or measuring tube outlets and of the measuring tube itself are essentially equal, and the measuring tube inlets or measuring tube outlets are arranged at an angle smaller than 90° relative to the measuring tube axis; however, the flow of the measured medium is also slowed here before the in-coupling and/or out-coupling surfaces, which here are also in turn formed by the coupling elements of the ultrasonic transducers installed into the measuring cell, and are arranged at an angle of 90° to the measuring tube axis. Here, chambers are likewise formed in front of the in-coupling and out-coupling surfaces. The sound-emitting and sound-receiving surfaces of the piezoelectric elements are each larger than the diameter of the measuring tube; however, the surface of the coupling element for coupling sound in or out axially closes off the measuring tube and is, consequently, of equal size.

A not prepublished patent application of Endress+Hauser filed in the German Patent- and Trademark Office and bearing Application No. 102008002027.3 discloses a measuring tube, which has in the region of an ultrasonic transducer seat pins of a part of a bayonet connector, and an ultrasonic transducer is embodied as a fitting counterpart, or as fitting second part, of the bayonet connector and is releasably mountable on the measuring tube therewith by means of a rotation.

SUMMARY OF THE INVENTION

An object of the invention is to provide a highly accurate measuring system with cost effectively exchangeable measuring tubes/measuring cells.

The object is achieved by a measuring system for determining and/or monitoring flow of a measured medium through a measuring tube with a first ultrasonic transducer and at least one additional, second ultrasonic transducer, wherein the measuring tube has a measuring tube inlet and a measuring tube outlet and a first ultrasonic transducer seat and at least one other, second ultrasonic transducer seat, wherein the first ultrasonic transducer is acoustically coupleable releasably with the first ultrasonic transducer seat of the measuring tube and wherein the second ultrasonic transducer is acoustically coupleable releasably with the second ultrasonic transducer seat of the measuring tube, wherein at least one ultrasonic transducer has at least one latch, which latch can be switched between positions and is so embodied that the latch can engage in at least one raised portion or depression arranged on the measuring tube and the ultrasonic transducer is mountable on the measuring tube releasably and is acoustically coupleable with the ultrasonic transducer seat of the measuring tube. At least one ultrasonic transducer includes at least one latch, which latch can be switched between positions and is so embodied that the latch in a closed state, in which the ultrasonic transducer assumes a mounted position on the measuring tube, can engage, thus e.g. engages, hooks in or even grips around, at least one raised portion or depression arranged on the measuring tube and, with the engaging of the latch, the ultrasonic transducer is mounted releasably on the measuring tube and is coupled acoustically with the ultrasonic transducer seat of the measuring tube. The determining and/or monitoring of flow occurs e.g. according to the travel-time difference principle.

Raised portions or depressions are, especially, pins, shoulders, annular grooves, shaft collars, etc. They are e.g. part a shaft/boss connection or a spring/groove connection.

The ultrasonic transducer and the depressions or raised portions on the measuring tube are part of a securement mechanism, especially a closure. By switching the latch between positions, movement of the ultrasonic transducer relative to the measuring tube, especially movement of a rotational type, is not necessary. The ultrasonic transducer is brought into the mounting position and by switching positions of the latch automatically secured in the measuring position. In such case, especially a linear movement is imposed on the ultrasonic transducer.

The closure, or securement, mechanisms can use many different manners of operation. Here, only some examples will be listed, without any claim that such is a complete listing. Thus, snap closures, or snap connections, can be just as suitable as a latch, or clamping, closure. Alternatively to pins, also annular grooves, such as e.g. a groove on the upper edge of the measuring tube, can be provided. The latch closure engages therein. If the groove extends only partially around the transducer seat, then the groove, which can be considered as functionally equivalent to a pin, becomes an annular groove of limited extent. In an embodiment, the closure has, especially, one of the wide variety of structures used for closing suitcases.

In an embodiment of the measuring system, the measuring tube has at least two pins on oppositely lying outer sides of the measuring tube in the region at least one ultrasonic transducer seat.

A pin refers, in such case, especially to a projecting piece for the transmission of forces, especially an offset end of a journal, which can receive a bearing. Pins serve to connect components with one another. In an example of an embodiment, the pins lie on an axis. In an embodiment of the measuring tube of the invention, this axis lies in the plane defined by the measuring tube axis and the measuring tube outlet axis and/or the measuring tube inlet axis.

In a first further development of the invention, the part of the securement mechanism, which is arranged on the ultrasonic transducer, is composed of a latch, e.g. a tension latch, and a clamping yoke, e.g. a tightening lever, which two are connected with one another via a first closure journal, wherein at least the latch is mounted rotatably on the first closure journal, and a second closure journal, which connects the clamping yoke with the ultrasonic transducer housing, wherein at least the clamping yoke is mounted rotatably on the second closure journal. Through rotation of the clamping yoke around the second closure journal, the latch is moved. In such case, it experiences a translational movement perpendicular to the second closure journal.

In a further development of the invention, at least one ultrasonic transducer includes at least a first guide element for guiding the ultrasonic transducer on a baseplate and the base plate includes at least one, second guide element fitting the first guide element of the ultrasonic transducer for guiding the ultrasonic transducer on the base plate, wherein the first guide element and the second guide element are mating parts of a linear guide.

The guide means are thus suitable essentially to fix the ultrasonic transducer to the base plate in two dimensions, while permitting it to be shiftable in the third dimension at least over a certain range of movement. The ultrasonic transducers are especially secured to the base plate in such a manner that they cannot rotate relative to the base plate. Thus e.g. the measuring tube is securable to the base plate and the sensors likewise, wherein the sensors are still shiftable on the base plate toward and away from the measuring tube.

The base plate is, however, not necessary, in order to orient and/or to secure the ultrasonic transducer on the measuring tube, it is optional, i.e. it serves only as support, or as a mounting base for the entire measuring system, wherein then mounting holes on its underside are provided, in order to secure the base plate itself in the process. When it is sensible in the application, an option is to dismount the base plate and therewith to make the entire system more flexible and movable.

In another further development of the invention, it is provided that the measuring tube has at least one plug or at least one coupling, in order to the manufacture a plugged connection between measuring tube and base plate on the measuring tube outside, and the base plate correspondingly has at least one plug or at least one coupling, in order to manufacture the plugged connection between measuring tube and base plate. This is optional. It is, however, also possible that no direct, or no force- and/or form- and/or material bonded, interlocking connection is provided between the base plate and the measuring tube.

In an additional further development, the raised portions or depressions are arranged on the measuring tube in the region of the ultrasonic transducer seats. An embodiment provides pins in the region of the ultrasonic transducer seats.

In a further development of the invention, it is provided that the ultrasonic transducers have, in each case, at least one electromechanical transducer element and/or, in each case, at least one coupling element, which coupling elements are arranged in the mounted state of the ultrasonic transducers between the electromechanical transducer elements of the ultrasonic transducer and the ultrasonic transducer seats of the measuring tube, which electromechanical transducer elements or which coupling elements are coupleable with the ultrasonic transducer seats of the measuring tube by means of a determinable force. The part of the ultrasonic transducer, which, in assembly with the measuring tube, is coupled acoustically, thus the electromechanical transducer element itself or a coupling element, which is then between the electromechanical transducer element and the measuring tube, is pressed with determined prestress against the measuring tube, or against ultrasonic transducer seats prepared therefor on the measuring tube.

In an additional further development of the solution, the force is appliable by means of a spring between an ultrasonic transducer housing and a sensor cup, wherein the electromechanical transducer element is arranged on the sensor cup.

The sensor cup is a component, which is seated, especially in the ultrasonic transducer housing itself, shiftably relative to the ultrasonic transducer housing only in one direction. The electromechanical transducer element is then placed, or secured, on a first end of the sensor cup. Located on the other end of the sensor cup is the spring. The spring delivers, thus, the pressing force for the acoustic coupling of the ultrasonic transducer on the measuring tube.

In an embodiment, by means of springs in the ultrasonic transducer, the electromechanical transducer element or the sound emitting- and/or receiving area of the interposed coupling element of the ultrasonic transducer is pressed, especially with a predetermined, or adjustable, force, on or against the transducer seating surface of the respective ultrasonic transducer seat. The force results from the prestress of the spring and is, in an embodiment, equal in each mounting.

Another further development of the measuring system of the invention, provides that the ultrasonic transducer seats are arranged in the region of the measuring tube inlet and/or in the region of the measuring tube outlet.

In an additional further development of the measuring system of the invention, the ultrasonic transducers have, in each case, at least one electromechanical transducer element, wherein the measuring tube with the ultrasonic transducer seats is so embodied that the electromechanical transducer elements in the mounted state of the ultrasonic transducer on the measuring tube face one another essentially pairwise planparallelly.

In an additional further development of the invention, the ultrasonic transducer seats are embodied pot shaped, with the respective transducer seating surface of the ultrasonic transducer seat as the pot floor, and the parts of the ultrasonic transducer, which are introducible into the pot-shaped ultrasonic transducer seats, or are inserted in the case of the mounting, have an insignificantly smaller constructed size. The ultrasonic transducers, especially the coupling elements and/or the electromechanical transducer elements, are fitted so into the ultrasonic transducer seats, that a movement of the ultrasonic transducers is limited, or no longer possible, in four of six degrees of freedom. A movement in the axial direction relative to the pot-shaped ultrasonic transducer seat and a rotation around just this axis is established by moving the latch between positions, without the position of the ultrasonic transducer having to be changed again in any essential respects.

In an additional further development of the invention, the base plate is so embodied that cables of the ultrasonic transducers are hidden and/or leadable on or in the base plate protected from external influences.

In a further development of the measuring system of the invention, the electromechanical transducer elements of the ultrasonic transducers are essentially smaller than the inner diameter of the measuring tube.

Another further development of the invention provides that the ultrasonic transducers have, in each case, at least two electromechanical transducer elements. The first and the second ultrasonic transducers have, in each case, two electromechanical transducer elements, which face one another pairwise, whereby two measuring paths arise. The ultrasonic transducers and, therewith, both of their electromechanical transducer elements are coupleable with the securement mechanism simultaneously to the measuring tube.

BRIEF DESCRIPTION OF THE DRAWINGS

The invention will now be explained in greater detail based on the appended drawing, in which, in each case, an example of an embodiment is presented. Equal elements are provided in the figures with equal reference characters. The figures of the drawing show as follows.

DETAILED DISCUSSION IN CONJUNCTION WITH THE DRAWINGS

Figure 1:
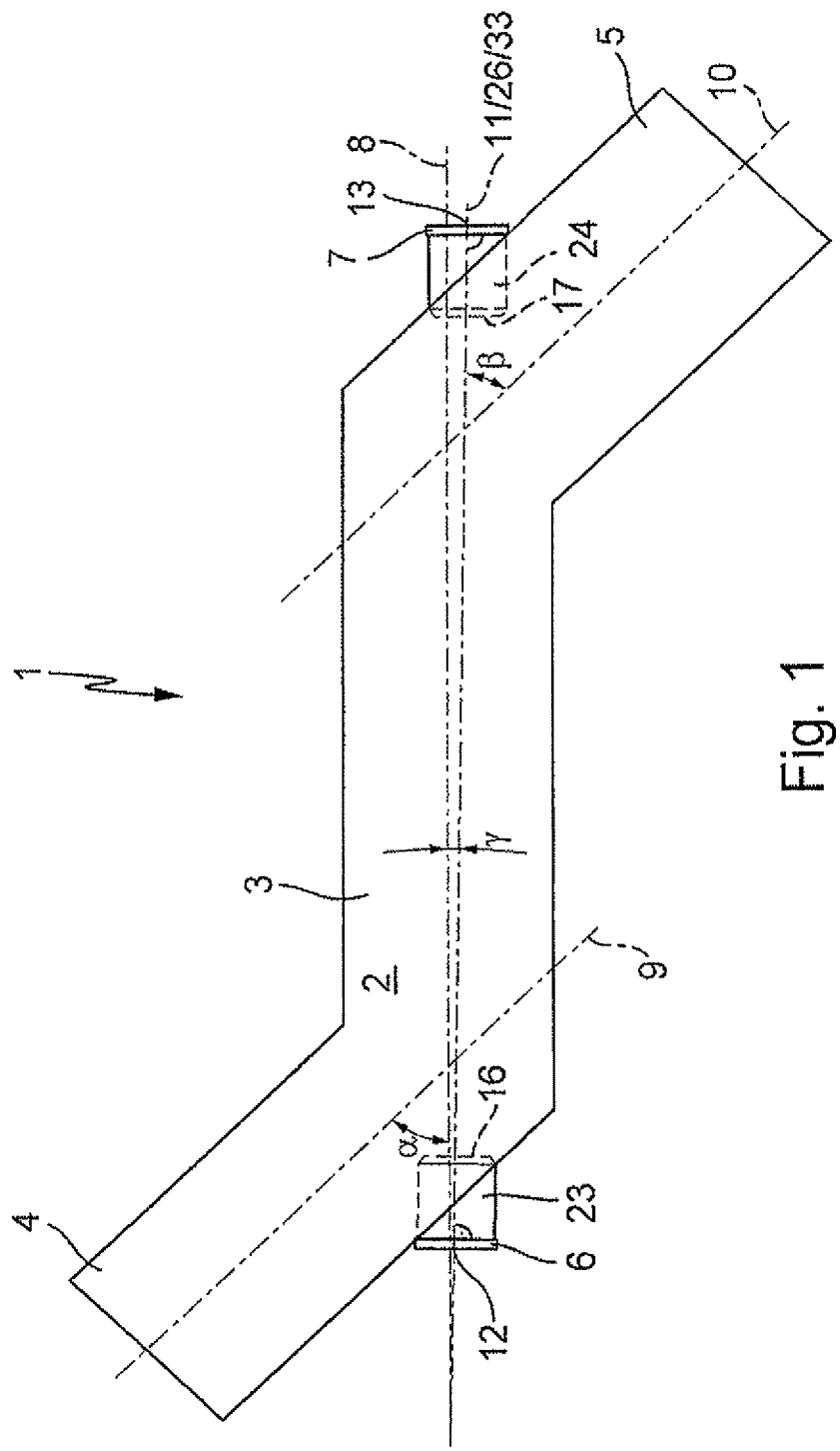
FIG. 1 shows schematically, a measuring system of the invention having a measuring tube of the invention.

FIG. 1 shows, schematically in section, a measuring tube 3 of the invention for a measuring system 1 of the invention. Measuring tube 3 has a first measuring tube inlet 4 and a first measuring tube outlet 5. Measuring tube inlet 4 has a cross section, which is approximately constant over its length. In this embodiment, this cross section is approximately equal to the cross section of measuring tube 3, both in shape as well as also in size. Measuring tube outlet 5, in contrast, is slightly conical, so that the cross section of measuring tube outlet 5 bordering on the measuring tube is somewhat larger than the cross section of measuring tube outlet 5 usable as a process connection. Both the measuring tube axis 8, as well as also the measuring tube inlet axis 9 and the measuring tube outlet axis 10 lie in one plane, here the plane of the drawing, with measuring tube inlet 4 and measuring tube outlet 5 being arranged on oppositely lying sides of the measuring tube 3.

Disc-shaped electromechanical transducer elements 6 and 7 for conversion of electrical signals into ultrasonic signals and/or vice versa are acoustically coupled on ultrasonic transducer seats 23 and 24. Ultrasonic transducer seats 23 and 24 have essentially cylindrical shapes. They assume the function of coupling the ultrasonic signals into the measured medium 2. To this end, the ultrasonic signals are produced by the electromechanical transducer elements 6, 7 and are coupled at the transducer seat surfaces into the ultrasonic transducer seats 23 and 24, which, for their own part, conduct the ultrasonic signals to measured medium 2 and, via their surfaces 16 and 17 for coupling sound in or coupling sound out, couple the ultrasonic signals into the measured medium 2. If the ultrasonic signals are led by the measured medium 2 back to the electromechanical transducer elements, they are then coupled out of measured medium 2 at surfaces 16 and 17 for coupling sound in or coupling sound out, and conducted by the ultrasonic transducer seats 23 and 24 to the electromechanical transducer elements 6, 7. Surfaces 16 and 17 for coupling sound in or coupling sound out are here smaller than the surfaces of electromechanical transducer elements 6, 7. Ultrasonic transducer seats 23 and 24 have, at least in the region of surfaces 16 and 17 for coupling sound in or coupling sound out, the shape of an exponential horn. The ultrasonic signals propagate along a so-called signal or measuring path. As is modeled here, a line-shaped measuring path is delineated. The wave fronts of the ultrasonic signal are essentially perpendicular to the measuring path.

Both the surfaces 16 and 17 for coupling sound in or coupling sound out, as well as also the electromechanical transducer elements 6, 7 and the transducer seat surfaces of ultrasonic transducer seats 23 and 24 possess an essentially circularly round cross section. The centers 27, 28 of surfaces 16 and 17 for coupling sound in or coupling sound out and the centers of electromechanical transducer elements 6, 7 and those of the transducer seat surfaces of ultrasonic transducer seats 23 and 24 lie on a single straight line.

Since electromechanical transducer elements 6, 7 are approximately planparallel to the surfaces 16, 17 for coupling sound in or coupling sound out, and surfaces 16, 17 for coupling sound in or coupling sound out lie essentially planparallelly opposite one another, and the cross sections of ultrasonic transducer seats 23 and 24 axially symmetrically change from the transducer seat surfaces to surfaces 16, 17 for coupling sound in or coupling sound out, the measuring path is considered to coincide with the connecting line 11 between the centers 12 and 13 of electromechanical transducer elements 6, 7. Therewith, the angle γ between connecting line 11 between centers 12 and 13 of first and second electromechanical transducer elements 6, 7 and the measuring tube axis 8 and the angle η between the connecting line between the centers of surfaces for coupling sound in and/or out 16, 17 and measuring tube axis 8, and the angle 8 between the connecting line between the centers of the transducer seat surfaces and measuring tube axis 8 are equal, and are also equal to the angle ζ of the measuring path.

The measuring path, or also signal path, which is here equal to connecting line 11 between the centers 12 and 13 of electromechanical transducer elements 6, 7, is slightly inclined toward measuring tube axis 8. Angle ζ or γ amounts here to about 5°. However, the measuring path 11 extends completely on the side of measuring tube axis 8, on which the measuring tube outlet 5 is located. A first imaginary plane, as already described, is defined by measuring tube axis 8 and the measuring tube inlet and measuring tube outlet axes 9 and 10. A second imaginary plane is perpendicular to the first imaginary plane, and intersects the first imaginary plane in a first straight line of intersection. This first straight line of intersection is, in this embodiment, measuring tube axis 8. Then, the connecting line between the centers of surfaces 16, 17 for coupling sound in and/or coupling sound out—here, the measuring path—does not intersect the second imaginary plane. The measuring path 11 is located on the side of the second imaginary plane, on which also the measuring tube outlet 5 is arranged on the measuring tube 3.

Due to the already mentioned conditions, the areas of the electromechanical transducer elements 6, 7, of the transducer seat surfaces and especially of the surfaces 16, 17 for coupling sound in and/or out are smaller than the free cross section of the measuring tube 3, which is derivable here from the inner diameter of measuring tube 3.

Figure 2:
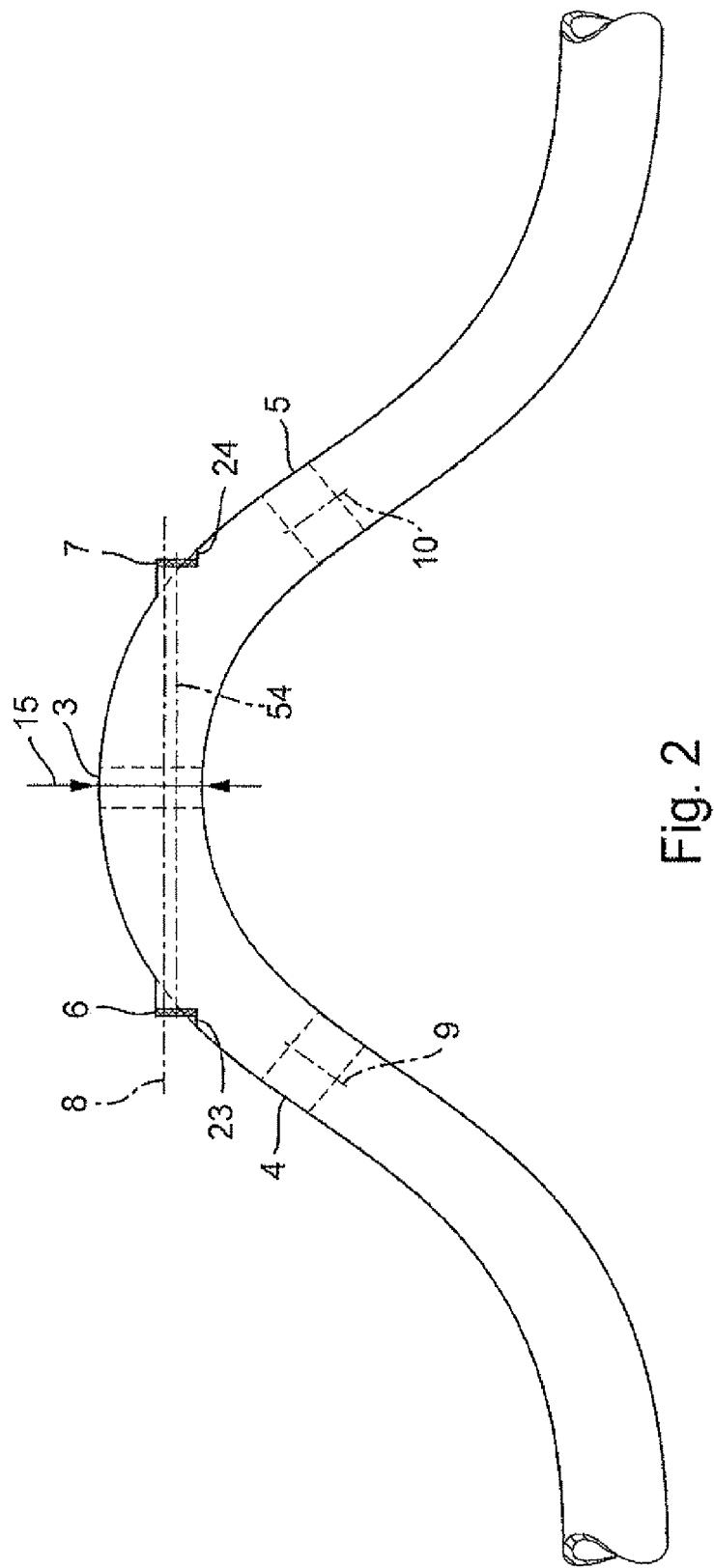
FIG. 2 is a further measuring system of the invention having a measuring tube of the invention.

FIG. 2 discloses a measuring system 1 of the invention with a further measuring tube 3 of the invention. In this example of an embodiment, measuring tube 3 has an approximately circularly round cross section and a short lengthwise extent relative to its diameter. Measuring tube inlet 4 and measuring tube outlet 5 also have approximately equal and circularly round cross sections. These are also short, viewed relative to their cross sections. In this example of an embodiment, measuring tube inlet 4 and measuring tube outlet 5 do not border directly on measuring tube 3. They are, however, in each case, connected with the latter via an intermediate tube 73, 74. Intermediate tubes 73, 74 are curved and/or bent. A defining of straight-line axes in intermediate tubes 73, 74 is, consequently, not readily possible. Both measuring tube 3, as well as also measuring tube inlet 4 and measuring tube outlet 5 have here a certain length with a straight central axis 8, 9, 10, on which all centers of the respective tube 3, 4, 5 lie.

Measuring tube outlet axis 10 and measuring tube axis 8 define a first imaginary plane; thus, both measuring tube outlet axis 10 as well as also measuring tube axis 8 lie in the first imaginary plane, here the plane of the drawing. Perpendicular to this first imaginary plane extends a second imaginary plane, wherein measuring tube axis 8 lies in this second imaginary plane, measuring tube axis 8 thus being part of the first straight line of intersection between the first and second imaginary plane. The connecting line between the centers of the first and second electromechanical transducer elements 6 and 7 (which here lie planparallelly opposite each other), this line being here equal to the inscribed measuring path, extends on the side of the measuring tube outlet and does not intersect the second plane. The measuring path instead lies in an imaginary third plane, which divides the inner diameter 15 of measuring tube 3 into thirds, and extends parallel to the second imaginary plane. Along the measuring or signal path, the propagation of the ultrasonic waves produced by the electromechanical transducer elements 6 and 7 occurs. The measured travel-time difference of these waves both in the direction of flow and counter to the flow of the measured medium in the measuring tube 3 enters into the calculation of the flow.

Due to the measuring path 54 being arranged in a region of the measuring tube 3, where, due to the special shape of the measuring tube 3, a flow profile known through calibrating is present—thus, measuring path 54 is located, for example, in a flow, which is accelerated in comparison to the flow reigning in the region of the measuring tube axis, the quality of the measuring or determining of flow is increased, especially for viscous measured media or overall very slow flows and/or flow rates.

Figure 3:
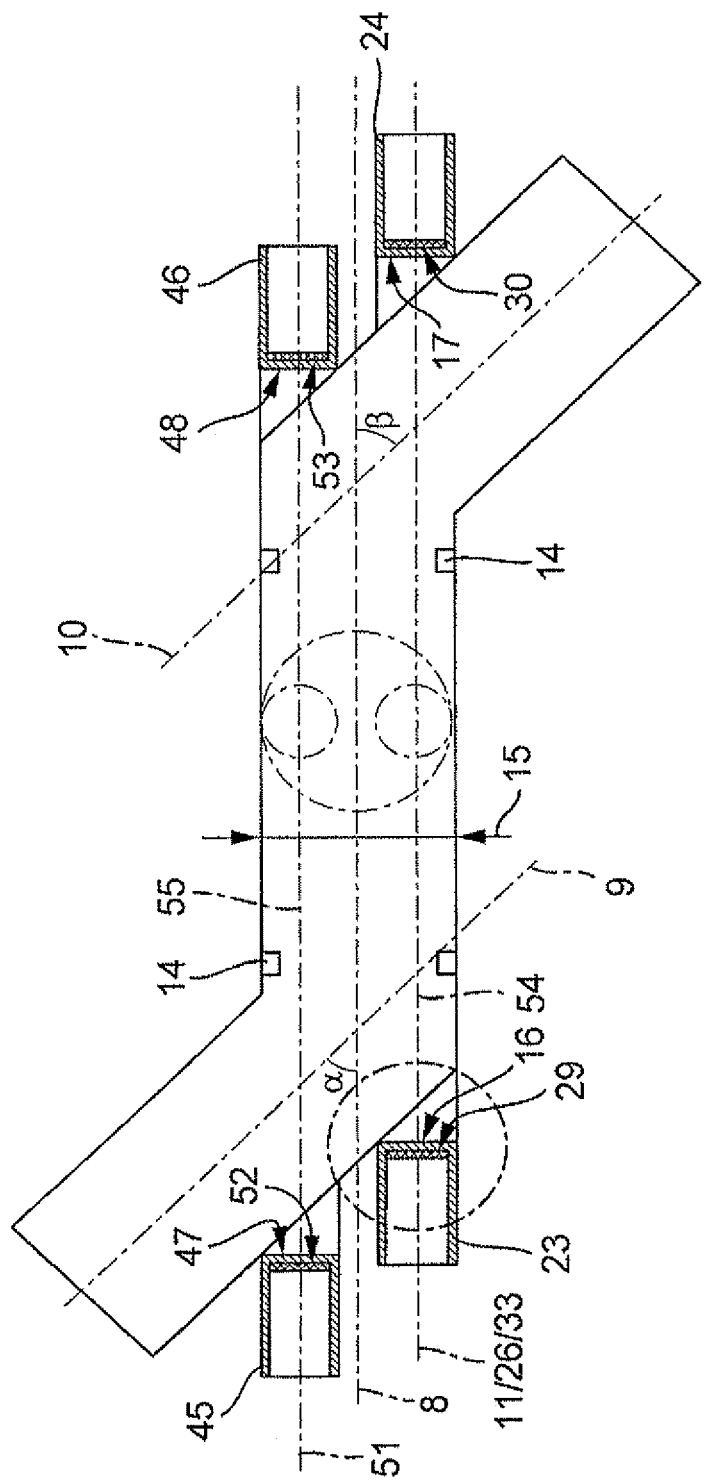
FIG. 3 is a further measuring system of the invention having a measuring tube of the invention.

FIG. 3 shows, schematically and in section, a further measuring tube 3 of the invention for a measuring system of the invention 1. It has essentially equal cross sections for measuring tube inlet 4 and outlet 5 and measuring tube 3. Both measuring tube inlet 4 as well as also measuring tube outlet 5 form angles of about 45° with measuring tube axis, thus a $\alpha \approx \beta \approx 45°$. Furthermore, measuring tube 3 includes four ultrasonic transducer seats 23, 24, 45, 46. Ultrasonic transducer seats 23, 24, 45, 46 are, in each case, embodied in a pot-shaped manner. In the pot-shaped ultrasonic transducer seats 23, 24, 45, 46, electromechanical transducer elements 6, 7, 19, 20 can be installed. Ultrasonic transducer seats 23, 24, 45, 46 then serve as coupling elements between electromechanical transducer elements 6, 7, 19, 20 and the measured medium 2 in measuring tube 3. The electromechanical transducer elements 6, 7, 19, 20 are acoustically coupled with transducer seat surfaces 29, 30, 52, 53 of ultrasonic transducer seats 23, 24, 45, 46. In this example of an embodiment, the transducer seat surfaces 29, 30, 52, 53 likewise represent the pot inner floor of the pot-shaped ultrasonic transducer seats 23, 24, 45, 46.

The connecting line 26 between centers 27 and 28 of the first and second surface 16, 17 for coupling sound in and/or out, this line corresponding here to the connecting line 11 between first and second electromechanical transducer elements 6, 7, thus forms, according to the invention, an angle γ with measuring tube axis 8. Here, this angle γ is 0° or 180°, i.e. the connecting line 26 and measuring tube axis 8 are parallel to one another. The same is true for the connecting line 51 between the centers 49 and 50 of the third and fourth surface 47, 48 for coupling sound in and/or out.

The four ultrasonic transducer seats 23, 24, 45, 46 lie in pairs opposite one another, wherein the first and the third ultrasonic transducer seats 23, 45 lie in the region of measuring tube inlet 4, and the second and the fourth ultrasonic transducer seats 24, 46 are arranged in the region of measuring tube outlet 5. In this way, two measuring paths 54, 55 are yielded, wherein the first measuring path 54 is located between the first and second electromechanical transducer elements 6 and 7, which are here arranged in the first and second ultrasonic transducer seats 23, 24, and wherein the second measuring path 55 is located between the third and fourth electromechanical transducer elements 19 and 20, arranged in the third and fourth ultrasonic transducer seat 45, 46. In such case, the two measuring paths are parallel to measuring tube axis 8, i.e. they are arranged at an angle ζ, and ξ, and respectively, these being angles of approximately 0° or 180° to measuring tube axis 8, and the two measuring paths 54, 55, in each case, coincide with the respective connecting lines 11, 51, 26, 33 between the centers of the surfaces 16, 17, 47, 48 for coupling sound in and/or coupling sound out, and, respectively, transducer seat surfaces 29, 30, 52, 53. Transducer elements 6 and 7, as well as 19 and 20, which lie in pairs opposite each other, are thus essentially planparallel to one another. Of course, both electromechanical transducer elements 6, 7, 19, 20 as well as also surfaces 16, 17, 47, 48 for coupling sound in and/or coupling sound out are considerably smaller than the measuring tube diameter 15.

As the figure illustrates, measuring tube axis 8 divides the cross section of the inner diameter 15 of measuring tube 3 in two equally large parts. As can likewise be recognized without difficulty, this divided inner diameter 15 is in turn divided by the first measuring path 54. Surfaces 16 and 17 for coupling sound in and/or coupling sound out, which lie opposite each other, are located completely and clearly on the side of measuring tube axis 8, on which measuring tube outlet 5 also lies. Therefore, the first measuring path 54 also lies clearly on the other side of a line, which divides inner diameter 15 of measuring tube 3 into thirds. Here, the first measuring path 15 even lies on a side of a so-called fourth plane—that is a plane parallel to a second imaginary plane, wherein this fourth plane divides the inner diameter 15 of the measuring tube 3 into fourths—wherein measuring tube outlet 5 is also arranged on this side of the imaginary fourth plane, wherein the second imaginary plane is perpendicular to a first plane, with measuring tube axis 8 as the straight line of intersection between the first and second plane, wherein the first plane is defined by measuring tube axis 8 and measuring tube outlet 5.

Additionally, measuring tube 3 has on its inner side two rings 14, which reduce the free cross section of measuring tube 3. In this way, the flow of the measured medium in measuring tube 3 is conditioned, and the accuracy of measurement is increased. The rings extend ⅟₁₀ of the inner diameter of the measuring tube into the measuring tube. Each ring has a distance from the measuring tube inlet 4 or outlet 5 lying nearest to it of 0 to ½ the measuring tube length. Via the rings, a linearizing of the measurement characteristic curve is reached, which, however, simultaneously requires a change of the algorithm for determination of the Reynolds number.

Figure 4:
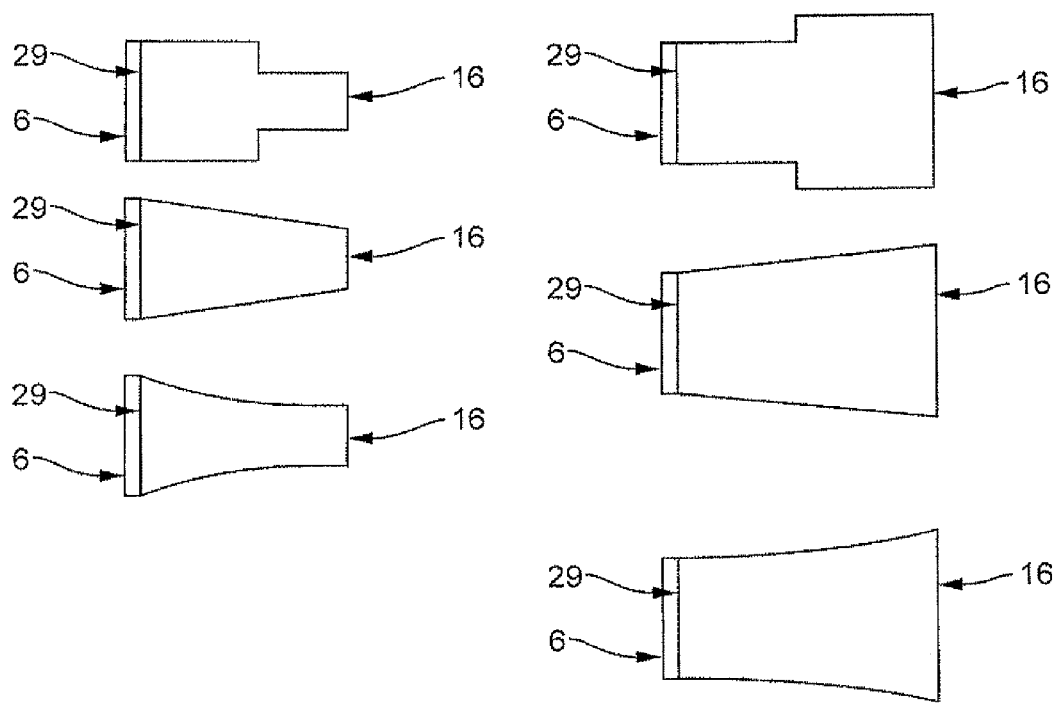
FIG. 4 shows various coupling elements in cross section.

In FIG. 4, different coupling elements are drawn in cross section. Through a reduction in the cross sectional area from transducer seating surface 29 to surface 16 for coupling sound in and/or out, the signal energy of the electromechanical transducer element 6 is concentrated. This is advantageous for radiating ultrasonic signals. Conversely, the increasing of the cross sectional area from transducer seating surface 29 to surface 16 for coupling sound in and/or out acts as a funnel for occurring ultrasonic signals. Their signal energy is, in turn, concentrated before impinging on the electromechanical transducer element 6. In principle, the directional characteristic and the sensitivity/radiative power are optimized by the different coupling elements for their respective cases of application.

The coupling elements take, in such case, different forms. Only a selection thereof is shown, without claim of completeness. Besides a step-shaped coupling element, coupling elements in the form of a frustum or of an exponential horn are also presented. A system of acoustic lenses is likewise imaginable.

Figure 5:
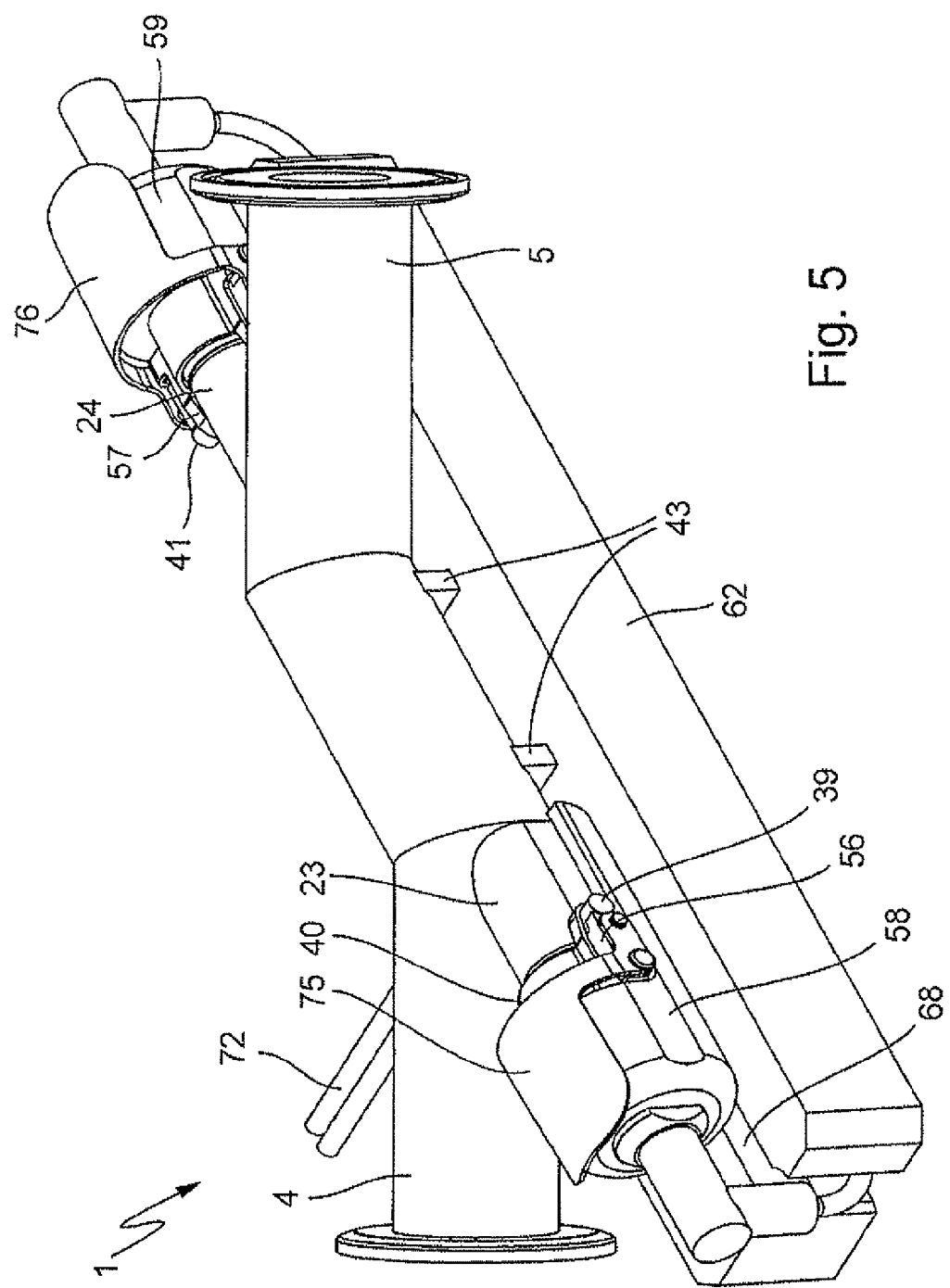
FIG. 5 is a measuring system of the invention having two ultrasonic transducers, a measuring tube and a base plate, as viewed from above.

Sketched three dimensionally in FIG. 5 is a measuring system 1 of the invention. This measuring system 1 includes a base plate 62 having a coupling (not shown) for securing the measuring tube 3. The measuring tube 3 in turn includes a plug 43 suitable for the coupling base plate 62. Via a plugging of the plug 43 into the coupling 44, measuring tube 3 is releasably connected with base plate 62, and secured against twisting and shifting. Measuring tube 3 can be moved relative to base plate 62 solely by unplugging. According to the invention, measuring tube 3 includes a measuring tube inlet 4 and a measuring tube outlet 5, which here lie in a plane. Alternatively to the plugged connection between measuring tube and base plate, also only a supporting of the measuring tube by the base plate is thinkable.

Furthermore, this measuring system 1 includes a first ultrasonic transducer 58 and a second ultrasonic transducer 59. In this example of an embodiment, the second ultrasonic transducer 59 is, similarly to measuring tube 3, plugged into base plate 62 and releasably connected therewith. Thus, the second ultrasonic transducer 59 can also only be moved relative to the base plate 62 by means of unplugging. The first ultrasonic transducer 58, in contrast, is shiftably seated on base plate 62 coaxially to the measuring tube axis. It includes a first guide element (not shown here), which, together with a second guide element 68 of base plate 62, assures the shiftability of the first ultrasonic transducer 58. Here, the second guide element 68 is a T-groove. A track, which is secured on the first ultrasonic transducer 58 and correspondingly embodied, enables shape-interlocking connection of first ultrasonic transducer 58 and base plate 62 with simultaneous degree of freedom for the first ultrasonic transducer 58 coaxially to the measuring tube axis. For mounting, the first ultrasonic transducer 58 is pushed onto measuring tube 3, and, by rotating the first latch 56, acoustically coupled to the measuring tube 3.

The first ultrasonic transducer 58 includes a first latch 56, and the second ultrasonic transducer 59 also includes a second latch 57. The latches 56, 57 are embodied in such a manner that, in the closed state, they engage with the pins 39, 40, 41 arranged on measuring tube 3 or on the ultrasonic transducer seats 23, 24, and thus releasably secure ultrasonic transducers 58 and 59 on the measuring tube 3. A possible embodiment of the mechanism for the securement is presented in FIGS. 8a and 8b. By toggling the clamping yokes 75 and 76, the latchs 56, 57 are thrown, and the ultrasonic transducers 58 and 59 are mounted or released from the measuring tube. FIG. 5 shows ultrasonic transducers 58 and 59 in the mounted state, and therewith shows latchs 56 and 57 in a closed state. The clamping yokes 75 and 76 serve here simultaneously as safety latches and locking levers.

Figure 6A:
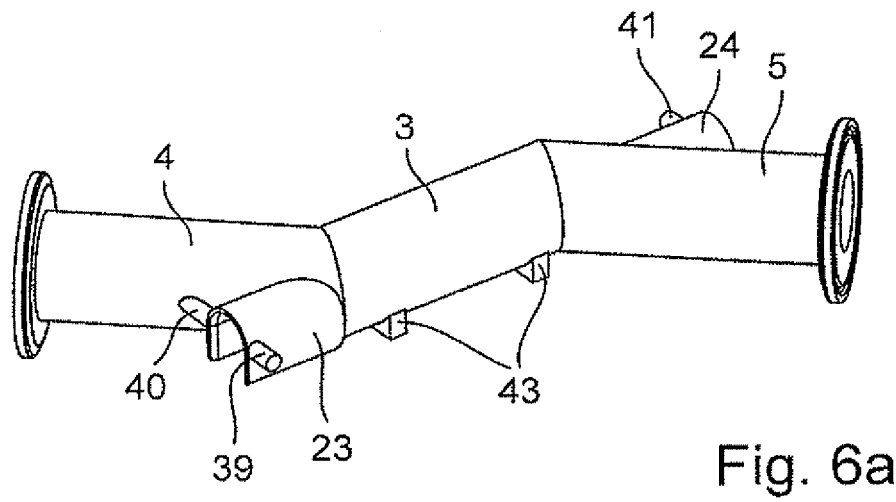
FIG. 6 shows 3 dimensional images of a measuring tube of the invention.
Figure 6B:
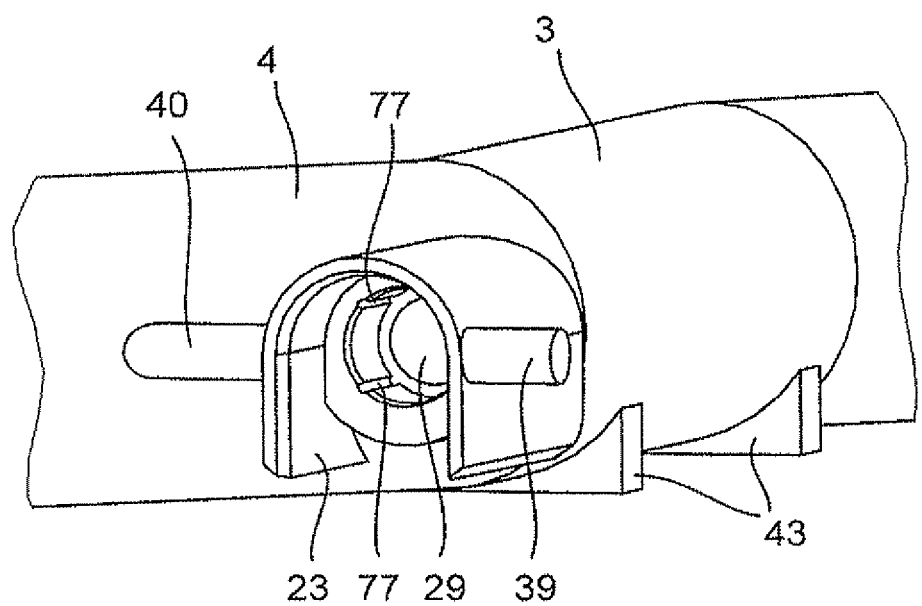

FIGS. 6a and 6b illustrate measuring tube 3 of FIG. 5, with measuring tube inlet 4 and measuring tube outlet 5. Shown are ultrasonic transducer seats 23 and 24, which are offset from the center of measuring tube 3. In this way, a measuring path arises, which extends on the side the measuring tube axis, on which measuring tube outlet 5 is located. Furthermore, legs 43 are provided on the measuring tube 3 for the docking of the measuring tube 3 onto a base plate, and pins 39, 40, 41 are provided for the coupling of ultrasonic transducers. The legs 43 merely support the measuring tube 3 on the base plate. The base plate, in this case, would have no coupling. The measuring tube 3 is here not connectable with the base plate and is held in position only via the ultrasonic transducers. The supporting of the measuring tube on the base plate can, however, be very useful in the installation or mounting. The first ultrasonic transducer seat 23 is embodied in a pot-shaped manner. A first transducer seating surface 29 forms the pot floor of ultrasonic transducer seat 23. The first electromechanical transducer element 6 can be acoustically coupled to this first transducer seating surface 29, either directly or indirectly, via a first coupling element of the first ultrasonic transducer. For guiding the first ultrasonic transducer, the first ultrasonic transducer seat 23 includes guiding rails 77, which serve here for measuring tube axis coaxial orientation and for guiding the first ultrasonic transducer.

Figure 7:
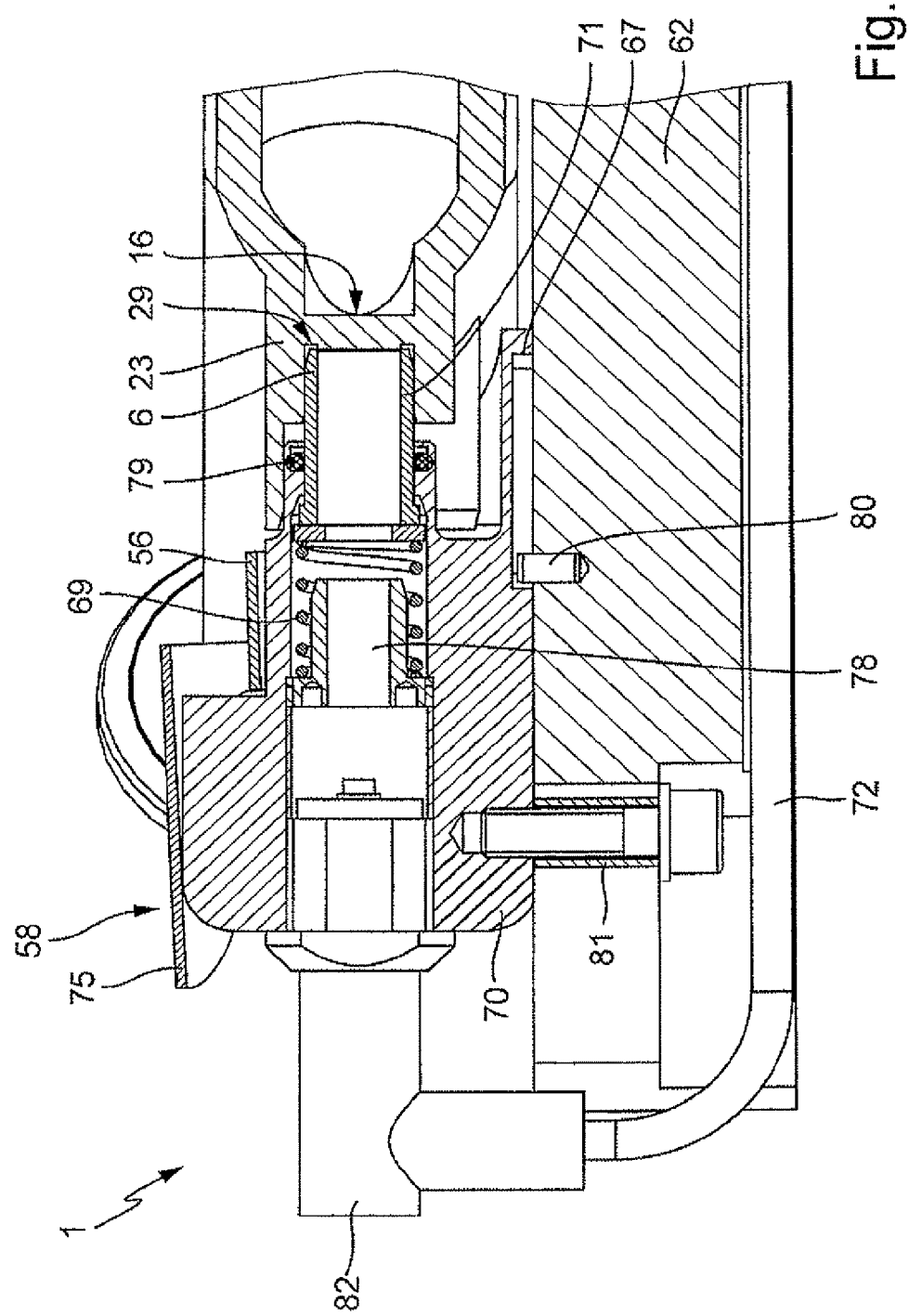
FIG. 7 is a detailed cross section of a measuring system of the invention

FIG. 7 shows a cross section through a measuring system 1 of the invention having a measuring tube of the invention, a first ultrasonic transducer 58 and a base plate 62. The first ultrasonic transducer 58 includes a first electromechanical transducer element 6, by means of which received ultrasonic signals are converted into electrical signals, or, which transduces electrical signals into ultrasonic signals. The first electromechanical transducer element 6 is arranged on the tip of a so-called sensor cup 71. Sensor cup 71 is implemented in the first ultrasonic transducer seat 23. The first electromechanical transducer element 6 is in approximately gapless acoustic contact with the first transducer seating surface 29 of first ultrasonic transducer seat 23. The centers of the first transducer seating surface 29 of the first ultrasonic transducer seat 23 and the first electromechanical transducer element 6 lie on an axis, wherein this axis is the same as the connecting line between the centers of the first surface 16 for coupling sound in and/or out of the first ultrasonic transducer seat 23 and the second surface for coupling sound in and/or out of the second ultrasonic transducer seat, and is therewith the same as the first measuring path. The first ultrasonic transducer seat 23 is shown in a pot-shaped form, with the first transducer seating surface 29 serving as the pot floor.

The first electromechanical transducer element 6 and, respectively, the sensor cup 71 is spring biased via a helical spring 69. The spring force of helical spring 69 depends on, among other things, the position of the first ultrasonic transducer 58 relative to the first transducer seating surface 29. In the mounted state—thus when latches 56 are closed by toggling the first clamping yoke, here a clamping lever 75, and thus when the latches 56 have engaged with the pins on the measuring tube—such position is influenced only by manufacturing tolerances of the individual components. The spring force can be adjusted by means of an adjusting screw 78. Adjusting screw 78 is connected with the housing 70 of the first ultrasonic transducer 58. The helical spring 69 lies, on the one hand, against adjusting screw 78, and, on the other hand, against the sensor cup 71. Via adjusting screw 78, a predetermined force on first electromechanical transducer element 6 or on first transducer seating surface 29 can be selected.

In the axis parallel to the measuring path, first ultrasonic transducer 58 of the securement mechanism is secured with the latches and the pins. The other degrees of freedom are limited by means of first and second guide elements, which are arranged on the first ultrasonic transducer 58 and the base plate 62. In the mounted state, a movement of first ultrasonic transducer 58 relative to base plate 62 is possible only to the extent of the compression of spring 69. Alternatively thereto, a stop is provided on the ultrasonic transducer, which, in the case of closed tightening lever 75, prevents a further pressing in of the spring 69. The tasks and functions of the first and second guide elements, that is the so-called linear guiding of ultrasonic transducer 58 on base plate 62, are in this embodiment assigned to a cylindrical pin 80, which is firmly anchored in base plate 62, and to a guide track 67 in the ultrasonic transducer. Additionally, a screw in a spacing sleeve 81 is to a limited degree capable of a relative movement coaxially to the measuring path. The spacing sleeve 81 enables small movements the ultrasonic transducer 58 in both directions in the plane parallel to the base plate. The goal is that the ultrasonic transducers 58 are oriented on the measuring tube 3 exclusively by the ultrasonic transducer seats 23 and not by the guide track 67 as first guide element on the base plate.

Figure 8A:
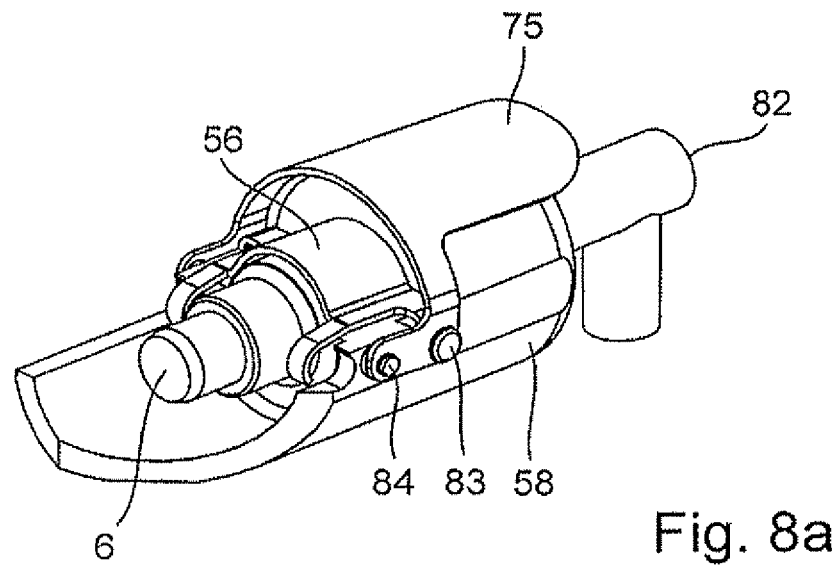
FIG. 8 shows a latch closure of the invention closure in 3D.
Figure 8B:
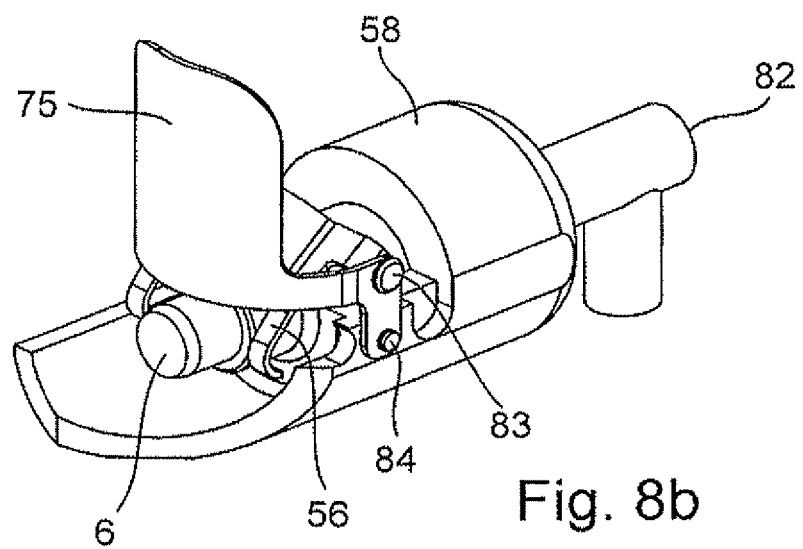

FIGS. 8a and 8b show a mechanism for securement of the ultrasonic transducer to the measuring tube. The first ultrasonic transducer 58 is shown in FIG. 8a with a closed securement mechanism, i.e. with a closed latch, and in FIG. 8b with an open latch. The first electromechanical transducer element 6 of ultrasonic transducer 58 can be seen, which is pressed onto the transducer seating surface (not shown) of the measuring tube in the mounted state. Via the angle plug 82 arranged on the other end of the ultrasonic transducer 58, the cables are led under the base plate.

A first axis 83 connects the first latch 56 and the first clamping yoke 75 in the manner shown. Via the second axis 84, only clamping yoke 75 is secured to ultrasonic transducer 58. In this way, in the case of a toggling of clamping yoke 75, there results a rotary and translational movement of first latch 56. This first latch is, in turn, embodied in such a manner, that it can engage the pin of the measuring tube, and thus secure the ultrasonic transducer to the measuring tube.

Figure 9:
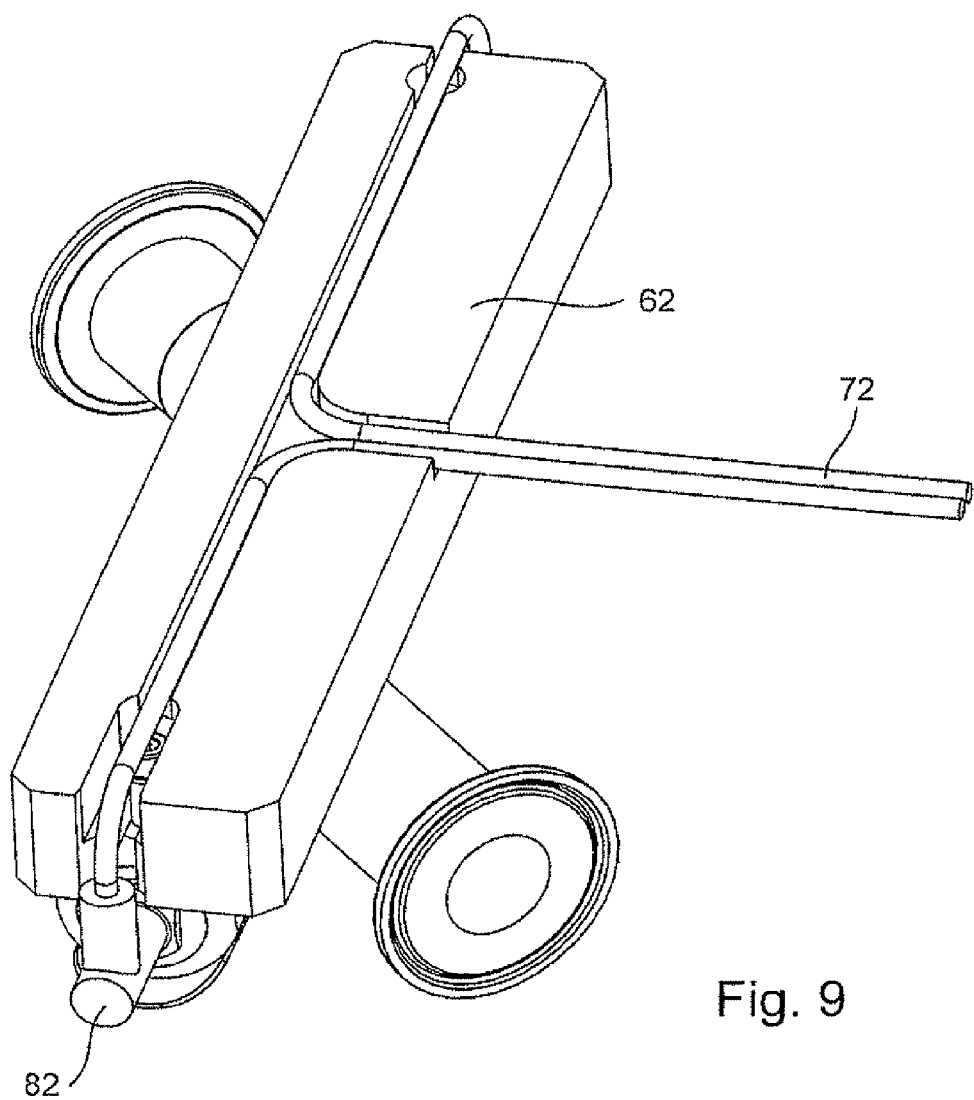
FIG. 9 shows a cable guide in a base plate of the invention.

FIG. 9 shows the underside of the previously described base plate 62. Shown is a cable conduit on the underside of base plate 62—thus on the side of the base plate facing away from the measuring tube—in which the cables 72 of the ultrasonic transducers are conveyed, concealed in base plate 62 and protected from external influences. Cables 72 are led via an angle plug 82 from the ultrasonic transducers to the underside of base plate 62.

Figure 10:
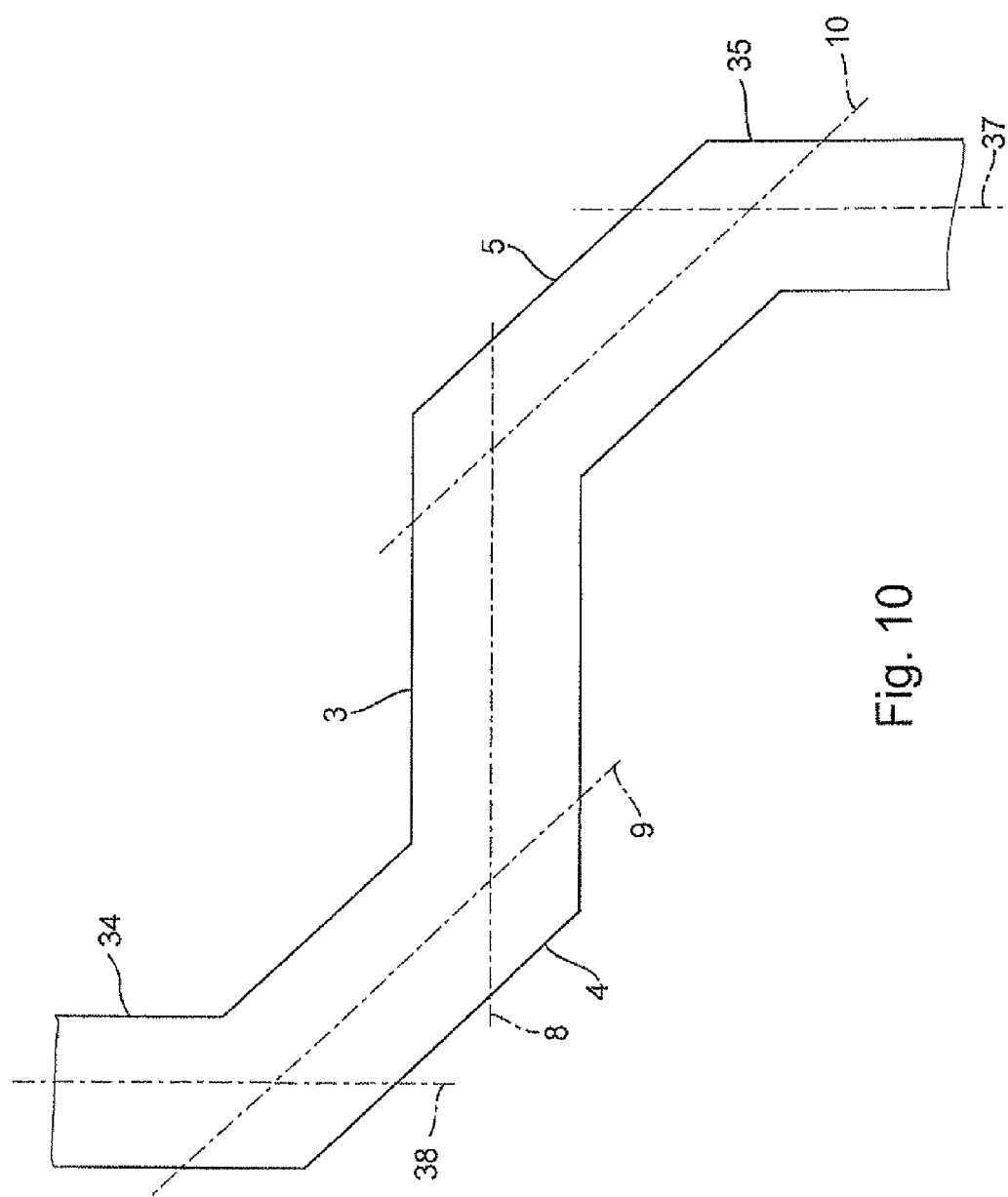
FIG. 10 shows a further measuring tube of the invention.

FIG. 10 shows an embodiment of an additional measuring tube 3 of the invention. Measuring tube 3 includes a first measuring tube inlet 4 and a first measuring tube outlet 5, which are arranged on measuring tube 3 at an angle of approximately 45° to measuring tube 3, i.e. the first measuring tube inlet axis 9 and the first measuring tube outlet axis 10, in each case, form an angle of about 45° with measuring tube axis 8. The first measuring tube inlet 4 and first measuring tube outlet 5 lie, in such case, on oppositely lying sides of measuring tube 3, i.e. the first measuring tube inlet axis 9 and the first measuring tube outlet axis 10 are parallel to one another and lie essentially in a plane.

Measuring tube 3 in this case includes an additional inlet section, i.e. an additional, second measuring tube inlet 34, and an additional outlet section, i.e. an additional, second measuring tube outlet 35, which, for their own part, in each case, have a central axis 36, 37. Second measuring tube inlet 34, in such case, borders on the first measuring tube inlet 4, and second measuring tube outlet 35 borders on the first measuring tube outlet 5. The second measuring tube inlet axis 36 forms in this example of an embodiment an angle of essentially 90° with the measuring tube axis, and the second measuring tube outlet axis 37 here likewise forms an angle of essentially 90° with the measuring tube axis. Also the second measuring tube inlet axis 36 and the second measuring tube outlet axis 37 lie in the same plane as the first measuring tube inlet axis 9, the first measuring tube outlet axis 10 and the measuring tube axis 8. In this way, flow of the measured medium in measuring tube 3 is conditioned in a predetermined manner.

The invention claimed is:

1. A measuring system for determining and/or monitoring flow of a measured medium through a measuring tube, comprising:
   a measuring tube;
   a first ultrasonic transducer;
   at least one additional, second ultrasonic transducer, wherein:
   said measuring tube has a measuring tube inlet, a measuring tube outlet, a first ultrasonic transducer seat; and at least one other, second ultrasonic transducer seat;
   said first ultrasonic transducer is acoustically coupleable releasably with said first ultrasonic transducer seat of said measuring tube;
   said second ultrasonic transducer is acoustically coupleable releasably with said second ultrasonic transducer seat of said measuring tube;
   at least one said ultrasonic transducer, has at least one latch, which latch can be switched between positions and is so embodied that said latch is engageable in at least one raised portion or depression portion arranged on said measuring tube;
   said at least one of said ultrasonic transducer is releasably mountable on said measuring tube and is acoustically coupleable with said ultrasonic transducer seat of said measuring tube;
   said at least one said ultrasonic transducer has at least a first guide element for guiding said at least one of said ultrasonic transducers on a base plate;
   said base plate has at least a second guide element fitting said first guide element of said at least one said ultrasonic transducer for guiding said at least one of said ultrasonic transducers on said base plate; and
   said first guide element and said second guide element are mating parts of a linear guide.

2. The measuring system as claimed in claim 1, wherein:
   raised portions or depressions are arranged on said measuring tube in the region of said ultrasonic transducer seats.

3. The measuring system as claimed in claim 1, wherein:
   said at least one of said ultrasonic transducers have, in each case, at least one electromechanical transducer element and/or, in each case, at least one coupling element, which coupling elements are arranged in the mounted state of said at least one of ultrasonic transducer between said electromechanical transducer elements of the ultrasonic transducers; and
   said ultrasonic transducer seats of said measuring tube, which electromechanical transducer elements or which coupling elements are coupleable by means of a determinable force with said ultrasonic transducer seats of said measuring tube.

4. The measuring system as claimed in claim 3, wherein:
   said force is appliable between an ultrasonic transducer housing and a sensor cup by means of a spring; and
   said electromechanical transducer element is arranged on said sensor cup.

5. The measuring system as claimed in claim 1, wherein:
   said ultrasonic transducer seats are arranged in the region of said measuring tube inlet and/or in the region of said measuring tube outlet.

6. The measuring system as claimed in claim 1, wherein:
said ultrasonic transducer seats are embodied pot shaped, with said respective transducer seating surfaces of said ultrasonic transducer seats being the pot floor, and the parts of said at least one of said ultrasonic transducers, which are introducible into said pot-shaped ultrasonic transducer seats have an insignificantly smaller size.

7. The measuring system as claimed in claim 1, wherein:
said at least one of said ultrasonic transducers have, in each case, at least one electromechanical transducer element;
said measuring tube with said ultrasonic transducer seats is so embodied that said electromechanical transducer elements in the mounted state of said at least one of said ultrasonic transducer on said measuring tube face one another essentially pairwise planparallelly.

8. The measuring system as claimed in claim 1, wherein:
said at least one of said ultrasonic transducers have, in each case, at least two electromechanical transducer elements.

9. The measuring system as claimed in claim 1, wherein:
said base plate is so embodied that a cable of said at least one of said ultrasonic transducers can be led on or in said base plate hidden/protected against external influences.

\* \* \* \* \*